(12) United States Patent
Ossanai et al.

(10) Patent No.: US 8,727,764 B2
(45) Date of Patent: May 20, 2014

(54) BLADE MOULD ASSEMBLY WITH LOCKDOWN MECHANISM

(75) Inventors: Leo Ossanai, Sorocaba (BR); Bernard Rossire, Sorocaba (BR)

(73) Assignee: Tecsis Tecnologia e Sistemas Avancados S.A., Sorocaba (BR)

( * ) Notice: Subject to any disclaimer, the term of this patent is extended or adjusted under 35 U.S.C. 154(b) by 300 days.

(21) Appl. No.: 13/142,667

(22) PCT Filed: Dec. 31, 2008

(86) PCT No.: PCT/IB2008/055603
§ 371 (c)(1),
(2), (4) Date: Aug. 10, 2011

(87) PCT Pub. No.: WO2010/076605
PCT Pub. Date: Jul. 8, 2010

(65) Prior Publication Data
US 2012/0021086 A1    Jan. 26, 2012

(51) Int. Cl.
*B29B 7/00*  (2006.01)
(52) U.S. Cl.
USPC .................. 425/451.9; 425/451.5; 425/450.1
(58) Field of Classification Search
USPC ................................. 425/451.9, 451.5, 450.1
See application file for complete search history.

(56) References Cited

U.S. PATENT DOCUMENTS

| 3,825,396 | A | * | 7/1974 | Kontz ........................... 425/541 |
| 4,204,825 | A |   | 5/1980 | Furnas |
| 4,248,583 | A |   | 2/1981 | Hedke et al. |
| 5,143,736 | A |   | 9/1992 | Kumamura et al. |
| 6,702,566 | B1 |  | 3/2004 | Bellasalma et al. |
| 7,223,091 | B2 |  | 5/2007 | Olsen et al. |
| 2006/0034971 | A1 | * | 2/2006 | Olsen et al. ................ 425/451.5 |

FOREIGN PATENT DOCUMENTS

| DE | 19649503 A1 * | 6/1998 | ............. B22C 21/08 |
| DE | 20218776 U1 | 4/2003 | |
| JP | 61239926 A | 10/1986 | |
| JP | H0222810 U | 2/1990 | |
| WO | 2010076605 A1 | 7/2010 | |

\* cited by examiner

*Primary Examiner* — Amjad Abraham
(74) *Attorney, Agent, or Firm* — Sughrue Mion, PLLC

(57) ABSTRACT

A blade mould assembly with lockdown mechanism for opening, closing or clamping blade mould assemblies is provided. The blade mould assembly includes a top mould portion, a bottom mould portion, and a lockdown mechanism. The lockdown mechanism includes an upper frame coupled to the top mould portion including an upper bearing device, a clamping pin extending substantially horizontally in the upper bearing device, and a lower frame coupled to the bottom mould portion. The lower frame includes a lower bearing device adapted to engage the under bearing device, a protractile rod, a latching element coupled to the protractile rod including a pivoting component, an inward clamping side, and an outward sliding side wherein the outward clamping side includes a pivoting recess and the inward clamping side includes a clamping recess. A guiding pin extends substantially horizontally in the pivoting recess when the protractile rod is fully extended.

2 Claims, 10 Drawing Sheets

BLADE MOULD ASSEMBLY WITH LOCKDOWN MECHANISM

CROSS-REFERENCE TO RELATED APPLICATION

This patent application is a National Stage of International Patent Application No. PCT/IB2008/055603, filed on Dec. 31, 2008. The contents of which are incorporated herein by reference in their entirety.

TECHNICAL FIELD

This invention relates to a mould assembly, particularly to details thereof or accessories therefor, and more specifically to details or accessories related to opening, closing or clamping wind turbine rotor blade mould assemblies.

BACKGROUND ART

Moulds for fabricating large wind rotor blades of composite materials are well known in the art. For example, U.S. Pat. No. 7,223,091 describes one such mould assembly. Rotor blade mould assemblies are generally composed of two mould portions, a top portion and a bottom portion that are closed about a longitudinal hinge line using a turn-over mechanism or crane. Usually, the bottom portion of the mould assembly is maintained in a fixed position while the top portion is rotated over the bottom portion so that the openings of the two mould portions oppose each other. Glue or other bonding paste is applied to the inner face of the bottom blade portion before the top blade portion descends thereon.

High accuracy and automation of the opening and closing of the mould is very desirable. Accurate positioning of the mould portions in relation to each other during closure of the mould is necessary in order to obtain precise engagement of mould portion edges and a high degree of bonding between the mould portions during the blade curing cycle.

DISCLOSURE OF INVENTION

Technical Problem

Although the mould portions used to produce large articles such as wind rotor blades are typically very heavy, the weight of the top mould portion is generally not sufficient to achieve a completely closed position when the top mould portion is rotated over the bottom mould portion. This may be in part due to the nature of the bonding paste present between the top mould portion and the bottom mould portion. In particular, the bonding paste present at the edges of the blade shell mould portions undergoes a change in viscosity during the blade curing cycle, which often times results in an incomplete or imperfect closure. Particularly when fabricating rotor blades of large dimensions, it is not enough to simply displace the upper mould portion over the lower mould portion nor is it sufficient to displace an upper bearing means associated with the top mould portion over an lower bearing means associated to the bottom mould portion, because said embodiments are not able to exert a downward force on the upper mould portion if overpressure in the blade mould assembly is desired.

Even in situations where the weight of the upper mould portion is sufficient to descend the upper mould portion to a completely closed position, control over the pressure securing the mould portions together would still be desirable in order to attain a high degree of bonding between the mould portions during curing. Further, in accordance with the specific features of the curing process, it may be desirable to descend the upper mould portion at a faster or slower rate.

Technical Solution

To solve the related technical problems, certain embodiments of the present invention are directed to a blade mould assembly with lockdown mechanism.

One embodiment of the present invention is directed to a blade mould assembly with lockdown mechanism that comprises at least one top mould portion, at least one bottom mould portion, and at least one lockdown mechanism. The lockdown mechanism comprises an upper frame coupled to the top mould portion comprising an upper bearing device, a clamping pin extending substantially horizontally in the upper bearing device, and a lower frame coupled to the bottom mould portion. The lower frame includes a lower bearing device adapted to engage the under bearing device, a protractile rod, a latching element coupled to the protractile rod comprising a pivoting component, an inward clamping side, and an outward sliding side wherein the outward clamping side comprises a pivoting recess and the inward clamping side comprises a clamping recess. The lockdown mechanism further comprises a guiding pin extending substantially horizontally in the pivoting recess when the protractile rod is fully retracted.

According to a particular embodiment, the blade mould assembly with lockdown mechanism includes the outward sliding side of the latching element positioning the guiding pin into the clamping recess thereby allowing the protractile rod to exert downward pressure on the upper mould portion.

Yet another embodiment is directed to a blade mould assembly with lockdown mechanism wherein the upper frame is provided with a fastening rod associated with the upper bearing means, the fastener rod having an under guide end associated with the clamping pin for driving the fastening rod into a pilot hole in the under bearing means of the under frame and for bringing the clamping pin within the under frame for engagement with the latching element clamping recess, securely fastening the upper mould to the under mould.

Advantageous Effects

The present invention has several advantages over the prior art. Namely, the blade mould assembly with lockdown mechanism provides fast and accurate opening and closure of mould portions. The blade mould assembly also prevents damage to the mould in cases where bonding paste cures before the top mould portion is descended down on the bottom mould portion.

DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing.

MODE FOR INVENTION

Figure 1:
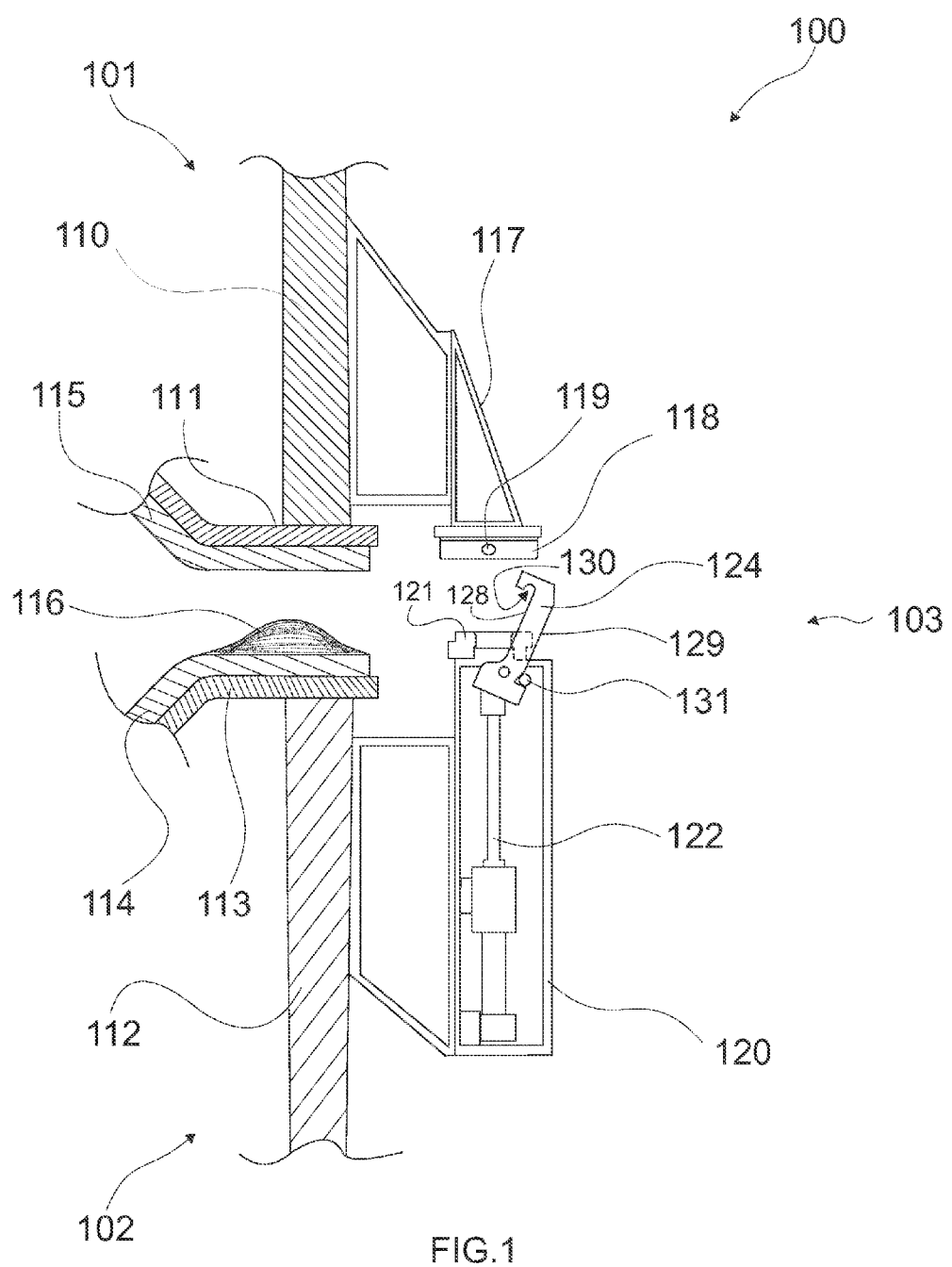
FIG. 01 is a cross-sectional view of a first embodiment of the present invention, wherein the blade mould assembly is in an open position after rotating a top mould portion over a bottom mould portion before curing of a bonding paste.

This invention is not limited in its application to the details of construction and the arrangement of components set forth in the following description or illustrated in the drawings. The invention is capable of other embodiments and of being practiced or carried out in various ways. Also, the phraseology and terminology used herein is for the purpose of description and should not be regarded as limiting. The use of 'including', 'comprising', 'having', 'containing', 'involving', and variations thereof is meant to encompass the items listed thereafter and equivalents thereof as well as additional items.

FIG. 01 illustrates one exemplary embodiment of an exemplary blade mould assembly (100). As depicted in FIG. 01, the blade mould assembly (100) is in an open position after rotating a top mould portion (101) over a bottom mould portion (102) before curing of a bonding paste (116) positioned on a lower blade shell (114) in the bottom mould portion (102). The blade mould assembly (100) includes the top mould portion (101) having an upper support structure (110) and an upper mould surface (111) and further includes the bottom mould portion (102) having a lower support structure (112) and a lower mould surface (113). The support structures (110) and (112) and mould surfaces (111) and (113) vary according to particular blade design and are well known to those skilled in the art. Prior to rotating the top mould portion (101) over the bottom mould portion (102), which rotation can be accomplished via power hinge, crane or any other suitable machine, a plurality of layers is laminated over the upper mould surface (111) and the lower mould surface (113) thereby forming an upper blade shell (115) and a lower blade shell (114). Such layers comprise fabric, metal, polymer, glass, carbon, wood, and other suitable materials as well as combinations thereof. The layers are laminated with a resin in order to bond them together. Various lamination techniques are used, such as resin film infusion, resin transfer moulding, vacuum infusion, among other processes well known to those skilled in the art. Prior to closing the mould, or during the process of closing the mould, bonding paste (116) is applied to the trailing and leading edges of the lower blade shell (114). The methods and conditions for the application of the bonding paste (116), as well as materials and tools relevant to such application, are generally known to those skilled in the art. Variations in the application of the bonding paste (116) may be suitable for the purposes of this invention, such as the application of the bonding paste (116) to the upper blade shell (115) edges or the use of catalysts.

As shown in FIG. 01, the blade mould assembly (100) includes at least one lockdown mechanism (103). The lockdown mechanism (103) comprises an upper frame (117) coupled to the upper support structure and/or to the top mould portion (101). The upper frame (117) includes an upper bearing device (118) and a clamping pin (119) that extends substantially horizontally in the upper bearing device (118). The lockdown mechanism (103) further includes a lower frame (120) coupled to the bottom mould portion (102). The lower frame (120) includes a lower bearing device (121) adapted to engage the upper bearing device (118) and a protractile rod (122). The lower frame (120) further includes a latching element (124) coupled to the protractile rod (122), which comprises an inward clamping side (128) and an outward sliding side (129). The latching element (124) comprises a pivoting recess (132) in the outward sliding side (129) and a clamping recess (130) in the inward clamping side (128). The lower frame (120) further includes a guiding pin (131) extending substantially horizontally in the pivoting recess (132) when the protractile rod (122) is fully retracted. The guiding pin (131) allows for the displacement of the outward sliding side (128) of the latching element (124) from an open position to a clamped position through the retraction of the protractile rod (122).

Figure 2:
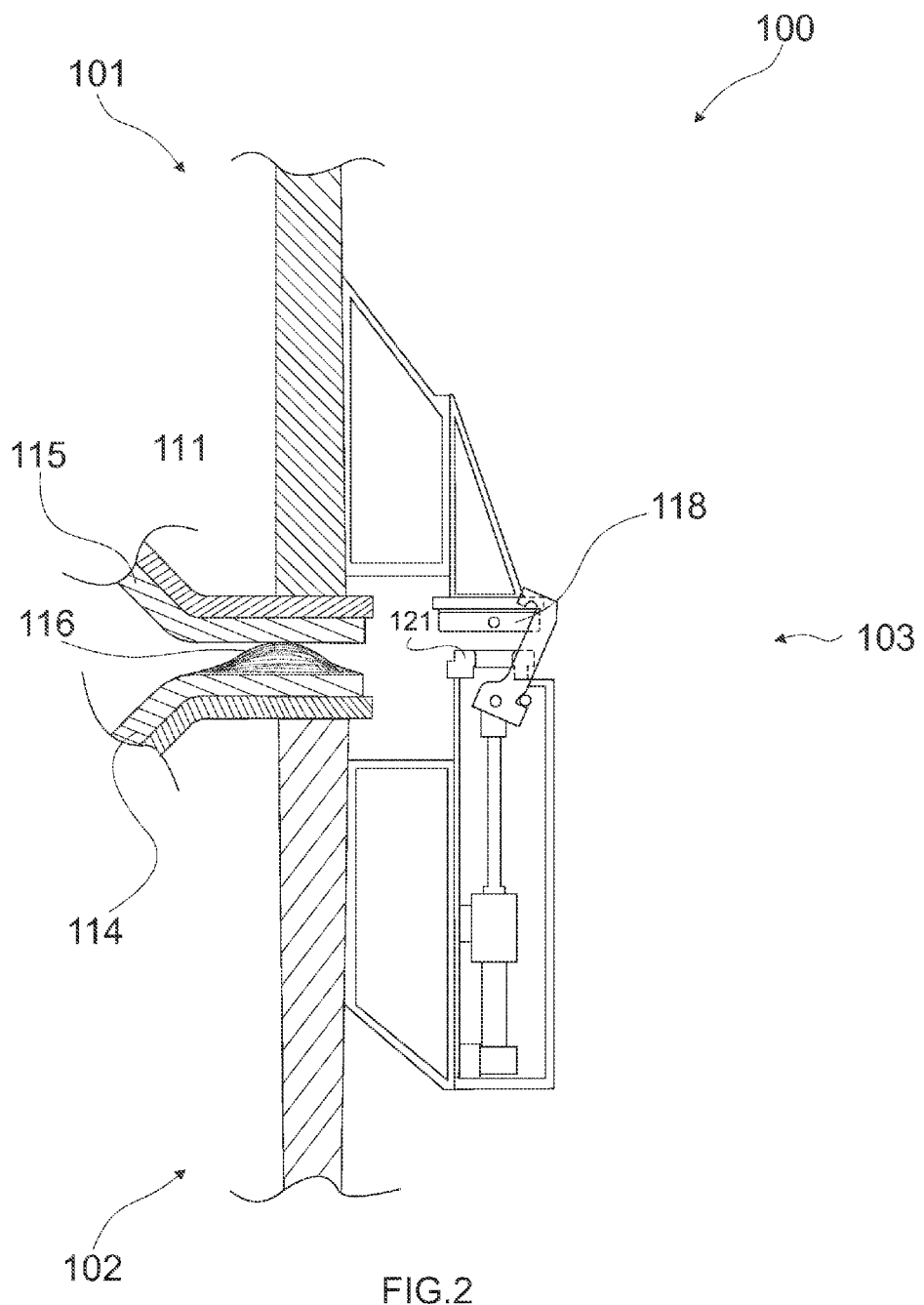
FIG. 02 is the cross-sectional view of the blade mould assembly shown in FIG. 01, wherein the blade mould assembly is in a partially closed position.

FIG. 02 illustrates the embodiment of FIG. 01, wherein the exemplary blade mould assembly (100) is in a partially closed position, in which the outer surface of the upper blade shell (115) begins to come in contact with the bonding paste (116). In the partially closed position as shown in FIG. 02, the upper bearing device (118) has not yet contacted the lower bearing device (121). However, depending on the circumstances, it may be desirable to position the upper bearing device (118) on top of the lower bearing device (121) as, for instance, in the case where control over the pressure exerted on the bonding paste (116) from the very first moment that the bonding paste (116) contacts the upper blade shell (115) is desired. Although the mould portions (101) and (102) used to produce wind rotor blades are very heavy, in the partially closed position shown in FIG. 02, the weight of the upper mould portion (101) is not sufficient to achieve a completely closed position. A reason for this may be that the bonding paste (116) between the edges of the lower blade shell (114) and upper blade shell (115), undergoes a change in viscosity during the blade curing process. Even if the weight of the upper mould portion (101) were sufficient to descend it to a completely closed position, compression of the bonding paste (116) and control over the pressure exerted on the lower mould portion (102) would still be desirable in order to attain a high degree of bonding. In accordance with the specific requirements of the curing process, it may be desirable to descend the upper mould portion (101) at a faster or slower rate. Therefore, particularly when fabricating rotor blade of a large dimension, it is not sufficient to simply displace the upper mould portion (101) over the lower mould portion (102). It is also not sufficient to displace the upper bearing device (118) associated with the upper mould portion (101) over the lower bearing device (121) associated with the lower mould portion (102), because said embodiments are incapable of exerting a downward force on the upper mould portion (101) if an overpressure in the blade mould assembly (100) is desired.

Figure 3:
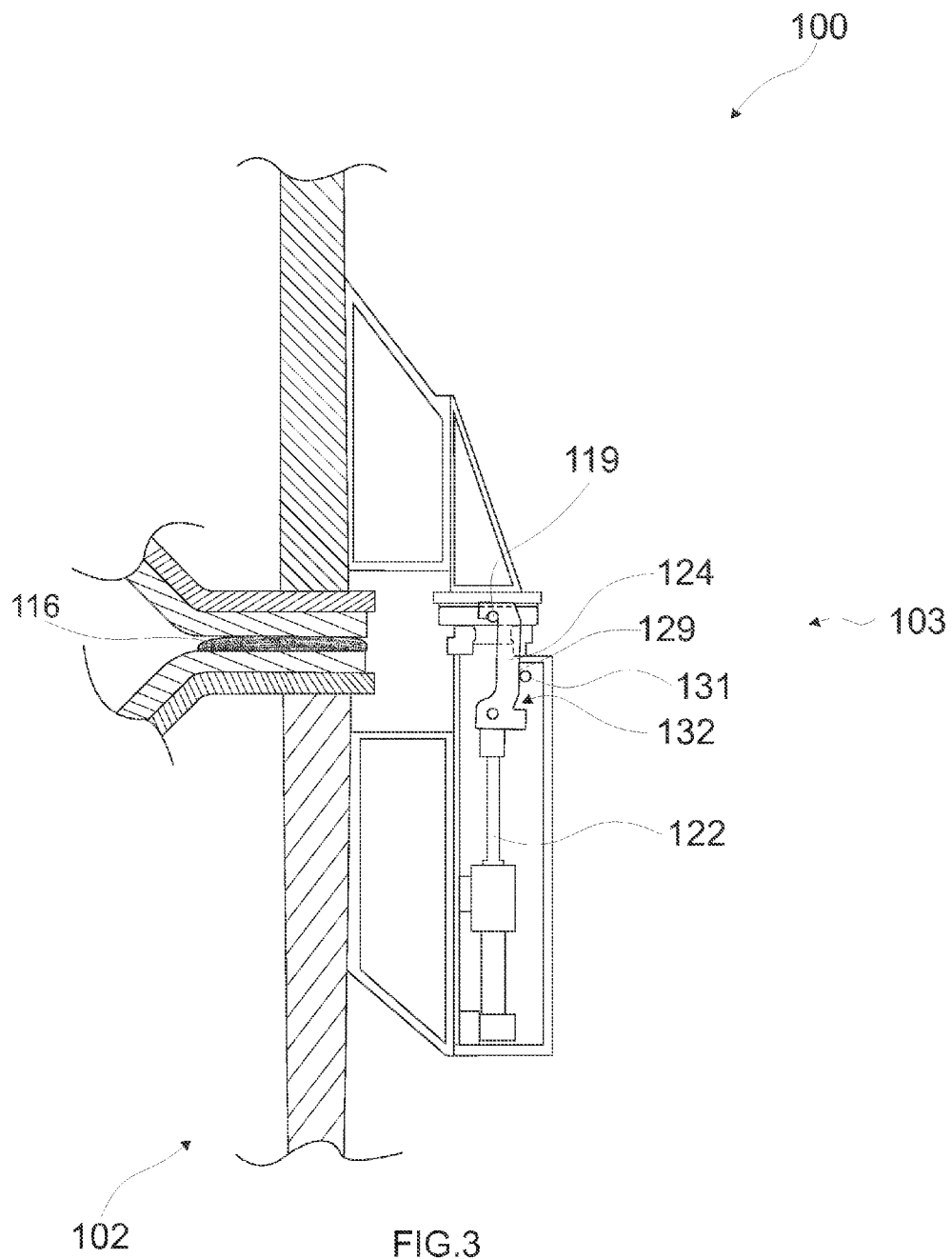
FIG. 03 is the cross-sectional view of the blade mould assembly shown in FIG. 01, wherein the blade mould assembly is in a substantially closed position with the protractile rod exerting a downward force on the upper mould portion.

FIG. 03 depicts the blade mould assembly (100) shown in FIG. 02 in a substantially closed position, with the protractile rod (122) exerting a downward force on the upper mould portion (101). This technical effect is advantageously obtained by the blade mould assembly lockdown mechanism (103) of the present invention. In the embodiment illustrated in FIG. 03, retraction of the protractile rod (122) allows the outward sliding side (129) of the latching element (124) to be displaced by the guiding pin (131) and the clamping recess (130) to engage the clamping pin (119). By continuing the retraction of the protractile rod (122), the upper mould portion (101) descends downward onto the lower mould portion (102) with a high degree of accuracy thereby providing control of the downward forces exerted on the blade mould assembly (100) throughout the cure cycle of the bonding paste (116).

Figure 4:
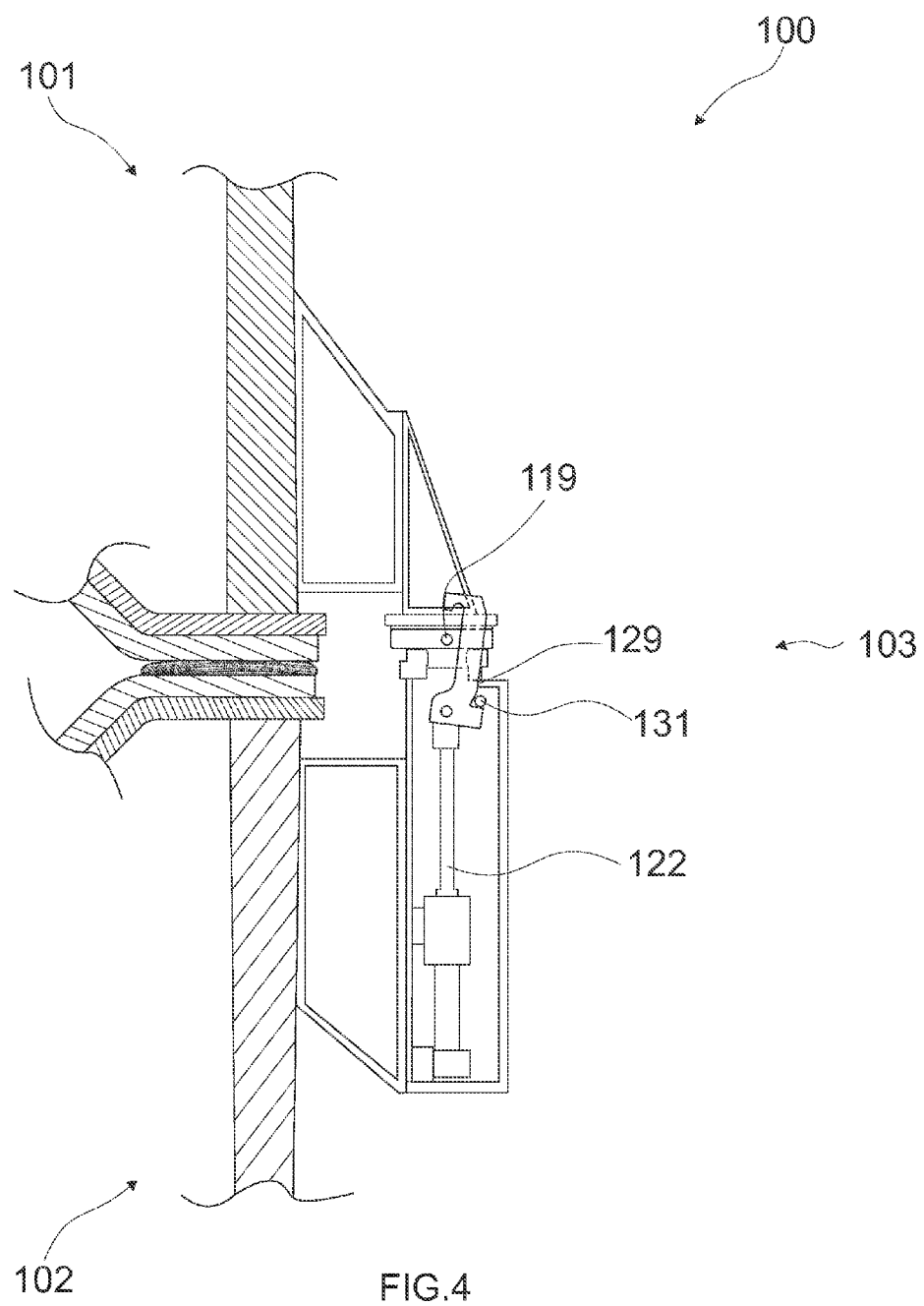
FIG. 04 is the cross-sectional view of the blade mould assembly shown in FIG. 01, wherein the blade mould assembly is in a substantially closed position, with the protractile rod being extended back.

In FIG. 04, the exemplary blade mould assembly (100) of FIG. 03 is depicted in a substantially closed position, with the protractile rod (122) being extended back. When the protractile rod (122) is extended, the guiding pin (131) rests in the pivoting recess (132). When the protractile rod (122) is retracted, the outward sliding side (129) of the latching element (124) slides is directed by the guiding pin (131) to the clamped position, in which the clamping recess (130) fastens to the clamping pin (119) so that the protractile rod (122) may push down the upper mould section (101) as shown in FIG. 03.

Figure 5:
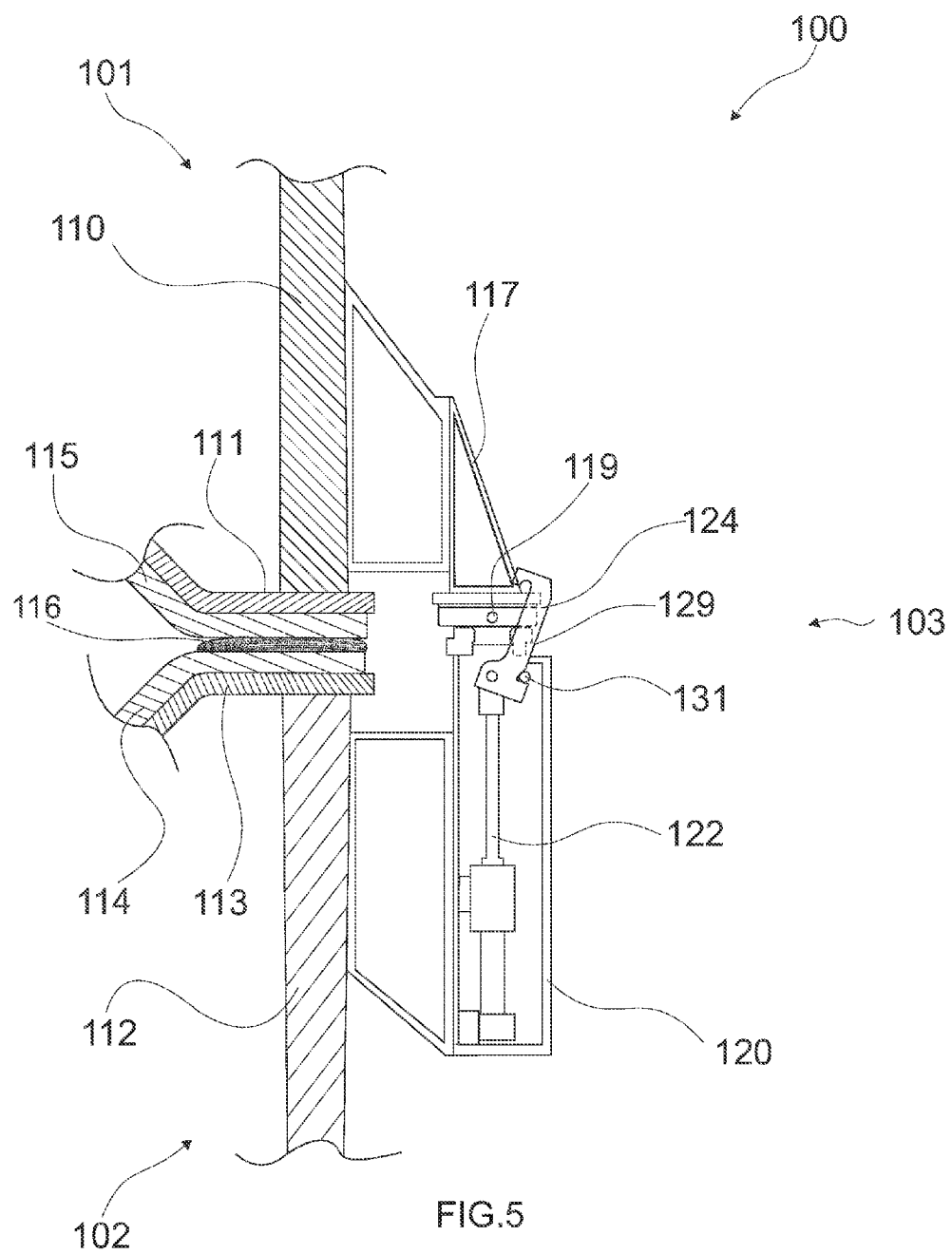
FIG. 05 is the cross-sectional view of the blade mould assembly shown in FIG. 01, wherein the blade mould assembly is in a substantially closed position, with the protractile rod extended for opening the blade mould assembly.

FIG. 05 illustrates the embodiment of FIG. 04, wherein the blade mould assembly (100) is in a substantially closed position with the protractile rod (122) extended for opening the blade mould assembly (100).

Figure 6:
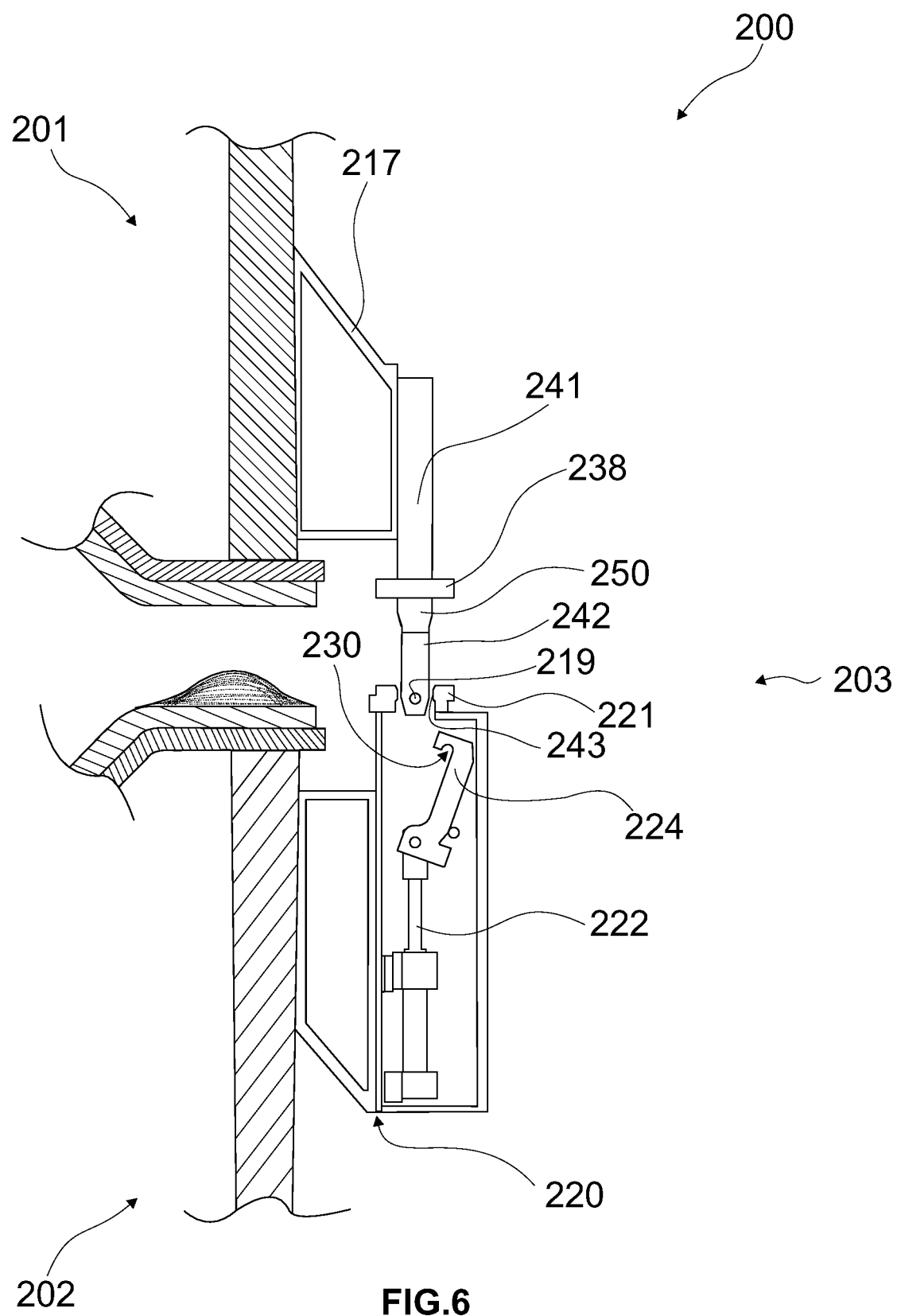
FIG. 06 is a cross-sectional view of a second embodiment of the present invention, wherein the blade mould assembly is in an open position after rotating a top mould portion over a bottom mould portion before curing of a bonding paste.

FIG. 06 illustrates another exemplary embodiment of the present invention. In FIG. 06, exemplary blade mould assembly (200) with lockdown mechanism (203) includes an upper frame (217) comprising a fastening rod (241) associated with the upper bearing device (238). The fastening rod (241) includes a lower guide (242) associated with the clamping pin (219) for driving the fastening rod (241) into a pilot hole (243) in the lower bearing device (221) of the lower frame (220) and for bringing the clamping pin (219) within the lower frame (220) for engagement with the latching element (224) clamping recess (230) in order to securely fasten the top mould portion (201) to the bottom mould portion (202). This embodiment is advantageous because in addition to the accurate positioning of the mould portions (201) and (202) in relation to each other during closure of the mould, the fastening rod (241) provides simultaneous guiding and a secured fastening of the mould portions (201) and (202). This is particularly advantageous in the case of large wind turbines because the moulds are typically very large and bulky. These results in gaps between the top mould portion and the bottom mould portion, and fatigue of the mould parts and rotating mechanisms (e.g. power hinge), as well as of the lower and upper frames and other tools, causing difficulties in the alignment of the top and bottom mould portions. In this aspect, the fastening rod (241) is particularly beneficial because the lower guide (242) has an inverted frustum shape in its lower end for driving the protractile rod (222) into the pilot hole (243), and a protrusion (250) that completely enters into the lower frame (220), aiding the locking of the fastening rod (241) to the lower frame (220).

Figure 7:
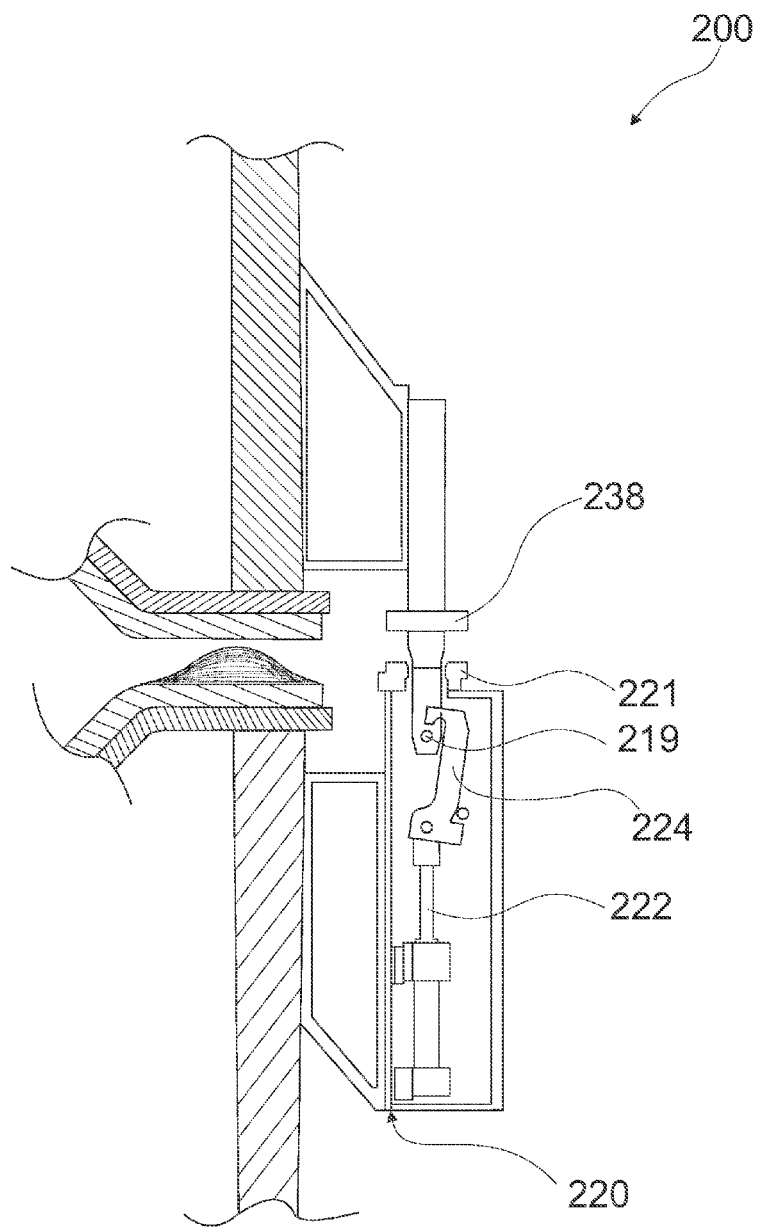
FIG. 07 is the cross-sectional view of the blade mould assembly shown in FIG. 06, wherein the blade mould assembly is in a partially closed position.

FIG. 07 illustrates the embodiment shown in FIG. 06, wherein the blade mould assembly (200) is in a partially closed position and the upper bearing device (238) has not yet contacted the lower bearing device (221). As shown in FIG. 07, the fastening rod (241) is entering into the lower frame (220) and the latching element (224) is being directed towards the clamping pin (219).

Figure 8:
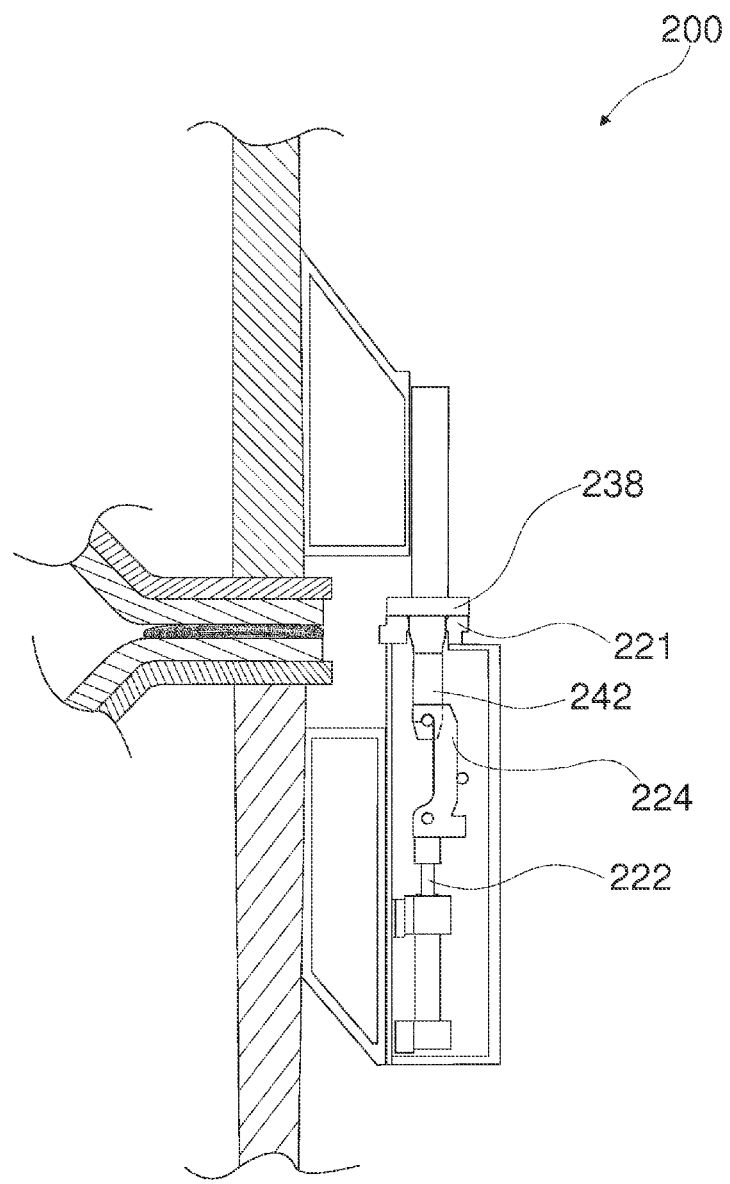
FIG. 08 is the cross-sectional view of the blade mould assembly shown in FIG. 06, wherein the blade mould assembly is in a substantially closed position with the protractile rod exerting a downward force on the upper mould portion.

FIG. 08 illustrates the blade mould assembly (200) of FIG. 06 wherein the lower guide (242) is within the lower frame (220). The upper bearing device (238) is resting over the lower bearing device (221) and the latching element (224) is clamped to the clamping pin (219) with the protractile rod (222) retracted.

Figure 9:
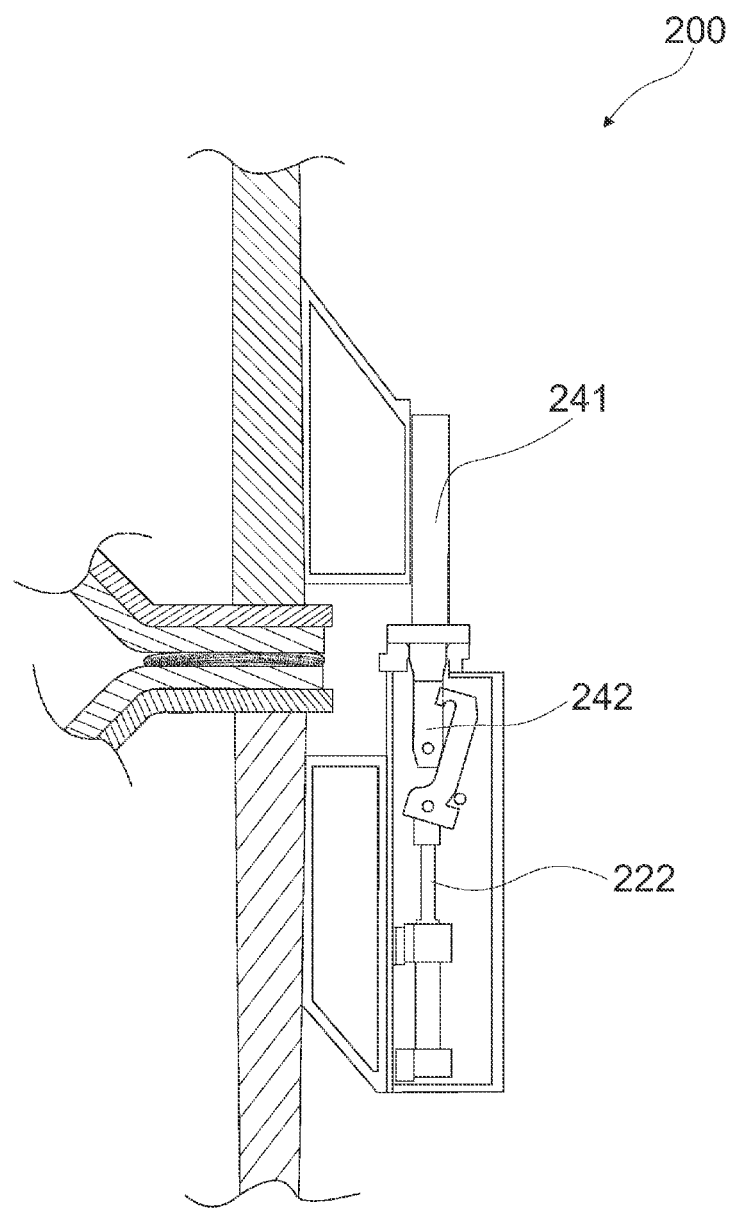
FIG. 09 is the cross-sectional view of the blade mould assembly shown in FIG. 06, wherein the blade mould assembly is in a substantially closed position, with the protractile rod being extended back.
Figure 10:
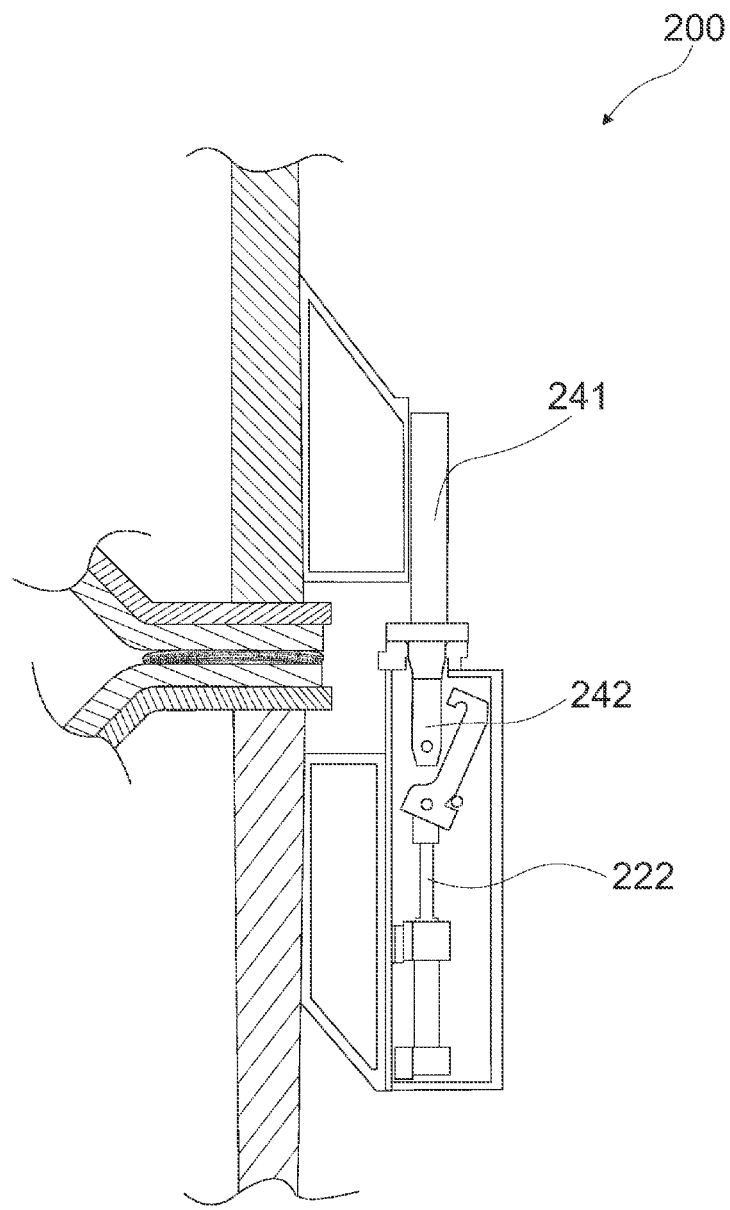
FIG. 10 is the cross-sectional view of the blade mould assembly shown in FIG. 06, wherein the blade mould assembly is in a substantially closed position, with the protractile rod extended for opening the blade mould assembly.

FIGS. 09-10 show the blade mould assembly (200) wherein the protractile rod (222) is extended, leaving the fastening rod (241) in a position that allows for opening the blade mould assembly (200).

The invention claimed is:

1. A blade mould assembly with lockdown mechanism comprising: at least one top mould portion, at least one bottom mould portion, and at least one lockdown mechanism comprising: an upper frame coupled to the top mould portion, comprising an upper bearing device and a clamping pin extending substantially horizontally in the upper bearing device; and a lower frame coupled to the bottom mould portion, comprising a lower bearing device adapted to engage the upper bearing device; a protractile rod; a latching element coupled to the protractile rod, the latching element comprising an inward clamping side, and an outward sliding side, opposite the inward clamping side, wherein the outward sliding side comprises a pivoting recess and the inward clamping side comprises a clamping recess; and a guiding pin extending substantially horizontally from the lower frame; wherein, when the protractile rod is in a fully extended position and the latching element is in an open position, the guiding pin is disposed within the pivoting recess, and when the protractile rod is in a retracted position and the latching element is in a closed position in which the clamping pin is held in the clamping recess, the guiding pin contacts a substantially planar portion of the outward sliding side, wherein the upper frame further comprises a fastening rod connected to the upper bearing device, the fastening rod comprising a an under guide end, wherein the clamping pin extends substantially horizontally from the under guide end of the fastening rod into a pilot hole, wherein the lower frame further comprises the pilot hole in the lower bearing device, and wherein the fastening rod is insertable into the lower frame via the pilot hole, thereby bringing the clamping pin into the lower frame for engagement with the latching element clamping recess.

2. The blade mould assembly with lockdown mechanism in accordance with claim 1 wherein, as the protractile rod moves from the fully extended position to the retracted position, the guiding pin contacts the substantially planar portion of the outward sliding side, thereby positioning the clamping recess of the latching element onto the clamping pin, thereby allowing the protractile rod to exert downward pressure on the upper mould portion.

* * * * *